(12) United States Patent
Matsubara

(10) Patent No.: US 7,990,002 B2
(45) Date of Patent: Aug. 2, 2011

(54) VIBRATION MOTOR

(75) Inventor: Masaaki Matsubara, Yonago (JP)

(73) Assignee: Minebea Motor Manufacturing Corporation, Meguro-Ku, Tokyo (JP)

( * ) Notice: Subject to any disclaimer, the term of this patent is extended or adjusted under 35 U.S.C. 154(b) by 131 days.

(21) Appl. No.: 12/385,290

(22) Filed: Apr. 3, 2009

(65) Prior Publication Data

US 2009/0251017 A1  Oct. 8, 2009

(30) Foreign Application Priority Data

Apr. 4, 2008 (JP) ................................. 2008-097667

(51) Int. Cl.
  *H02K 7/06* (2006.01)
  *H02K 5/00* (2006.01)
  *H02K 7/00* (2006.01)
  *H02K 1/00* (2006.01)

(52) U.S. Cl. .................. 310/81; 310/40 MM; 310/67 R; 310/193

(58) Field of Classification Search .................. 310/80, 310/81, 193, 40 MM, 67 R
See application file for complete search history.

(56) References Cited

U.S. PATENT DOCUMENTS

| 2004/0227418 | A1* | 11/2004 | Kim | 310/81 |
| 2006/0138885 | A1* | 6/2006 | Uchiumi et al. | 310/81 |

FOREIGN PATENT DOCUMENTS

| JP | 8-256449 | | 10/1996 |
| JP | 11-289734 | | 10/1999 |
| JP | 11-308817 | | 11/1999 |
| JP | 2001070884 A | * | 3/2001 |
| JP | 2005-102373 | | 4/2005 |
| JP | 2005102373 A | * | 4/2005 |
| JP | 2006-246588 | | 9/2006 |

OTHER PUBLICATIONS

Machine Translation JP2005102373 (2005) and JP2001070884 (2001).*

* cited by examiner

*Primary Examiner* — Quyen Leung
*Assistant Examiner* — Jose A Gonzalez Quinones
(74) *Attorney, Agent, or Firm* — McGinn IP Law, PLLC

(57) ABSTRACT

A vibration motor includes a rotary shaft, an armature core secured to the rotary shaft and having a plurality of salient poles, an armature coil wound around each of the salient poles except at least one salient pole, a frame serving as an outside cover, a plurality of magnets secured to the frame and having respective different polarities, and a weight adapted to rotate together with the rotary shaft and disposed eccentrically, wherein the weight is disposed inside the frame and secured to the armature core in such a manner that at least a part of the weight is inserted in a hollow provided in at least the one salient pole having no armature coil.

11 Claims, 13 Drawing Sheets

EQUIVALENT CIRCUIT

VIBRATION MOTOR

BACKGROUND OF THE INVENTION

1. Field of the Invention

The present invention relates to a vibration motor, and in particular to a vibration motor to be used for providing a physical sensation in a portable communication device such as a mobile phone and a PHS (Personal Handy-phone System) and a game device.

2. Description of the Related Art

For notifying a user of an incoming call in communication devices such as a mobile phone, two methods are available. In one method, sound is generated at the time of receiving the incoming call to acoustically inform the user of the incoming call, and in the other method, vibration is generated by a built-in vibration motor to physically inform the user of the incoming call. These two methods are both incorporated in the communication devices and can be switched over as appropriate.

Also, in order to enhance entertaining property in game devices, some game devices transfer vibration generated in steps with progresses of games by vibration motors embedded in the game devices to operators of the game devices.

A vibration motor of this type is configured to be secured on a circuit board in the device and, vibration is generated, for example, by a rotating eccentric weight attached to a motor shaft and the generated vibration is transferred to a housing of the device.

A vibration motor is mounted in a small-sized device such as a portable communication device in many cases and, therefore, miniaturization of the vibration motor itself is required. Conventionally, an eccentric weight is attached to an end of a motor shaft to generate vibration. Such configuration presents a problem that the eccentric weight is mounted outside a motor frame and, therefore, when the vibration motor is embedded in the portable communication device or the like, it is necessary to form an appropriate gap in a portion around the eccentric weight, which, as a result, causes complicated design.

To solve the above problem, in Patent Reference 1 (Japanese Patent Application Laid-open No. Hei 11-289734) or Patent Reference 2 (Japanese Patent Application Laid-open No. Hei 8-256449), inventions are disclosed in which, in order to be able to generate vibration without mounting the eccentric weight outside the motor frame, one of three salient poles being a magnetic pole of an armature core is removed and the remaining two salient poles are made to have eccentricity to generate vibration.

However, in the configuration as disclosed in Patent References 1 and 2 in which one of the three salient poles is removed, there is a problem that a cogging phenomenon increases and actually the motor would not rotate or sufficient output from the motor can not be obtained.

SUMMARY OF THE INVENTION

In view of the above, it is an object of the present invention to provide a vibration motor capable of stably rotating to generate vibration without causing an increase in a cogging phenomenon and without the need for providing an eccentric weight outside a motor frame.

According to an aspect of the present invention, there is provided a vibration motor which includes: a rotary shaft; an armature core secured to the rotary shaft and having a plurality of salient poles; an armature coil wound around each of the salient poles except at least one salient pole; a frame serving as an outside cover; a plurality of magnets secured to the frame and having respective polarities alternately different from each other; and a weight adapted to rotate together with the rotary shaft and structured to be eccentrically weighted with respect to the rotary shaft, wherein weight includes a main body portion, a first holding portion and a second holding portion such that the main body portion is sandwiched between the first holding portion and the second holding portion, is disposed inside the frame, secured to the armature core in such a manner that a part of the second holding portion is inserted in a hollow provided in the at least one salient pole having no armature coil, and secured to the rotary shaft by means of the first holding portion.

In the aspect of the present invention, the main body portion, the first holding portion and the second holding portion may be integrated with one another.

In the aspect of the present invention, the main body portion and the second holding portion may be integrated to each other, and the main body portion and the first holding portion may be engagingly connected to each other.

In the aspect of the present invention, the main body portion, the first holding portion and the second holding portion may be separated from one another, the main body portion and the first holding portion may be engagingly connected to each other, and the main body portion and the second holding portion may be engagingly connected to each other.

In the aspect of the present invention, the weight may be eccentrically weighted with respect to the rotary shaft to an angle range where the armature coil is disposed.

In the aspect of the present invention, the outermost radius of the weight is larger than the radius of a circle defined by radially inward surfaces of the magnets.

In the aspect of the present invention, the frame may have a cross section in which two plane portions are provided.

In the aspect of the present invention, the plane portion may be attached to a mounting board.

In the aspect of the present invention, the armature coils may make a V-connection.

With the above configurations, the vibration motor is capable of stably rotating to generate vibration without causing an increase in the cogging phenomenon and without the need for providing the eccentric weight outside the motor frame.

BRIEF DESCRIPTION OF THE DRAWINGS

The above and other objects, advantages, and features of the present invention will be more apparent from the following description taken in conjunction with the accompanying drawings in which:

FIG. 6B shows an equivalent circuit corresponding to the connection state;

DETAILED DESCRIPTION OF THE PREFERRED EMBODIMENTS

Best modes of carrying out the present invention will be described in further detail using various embodiments with reference to the accompanying drawings. In each of the following embodiments, the present invention is applied to a motor with a commutator as an example of a vibration motor of the present invention.

First Embodiment

Now, referring to FIGS. 1 through 6B, description is made about a motor with a commutator as a vibration motor according to a first embodiment of the present invention.

Figure 1:
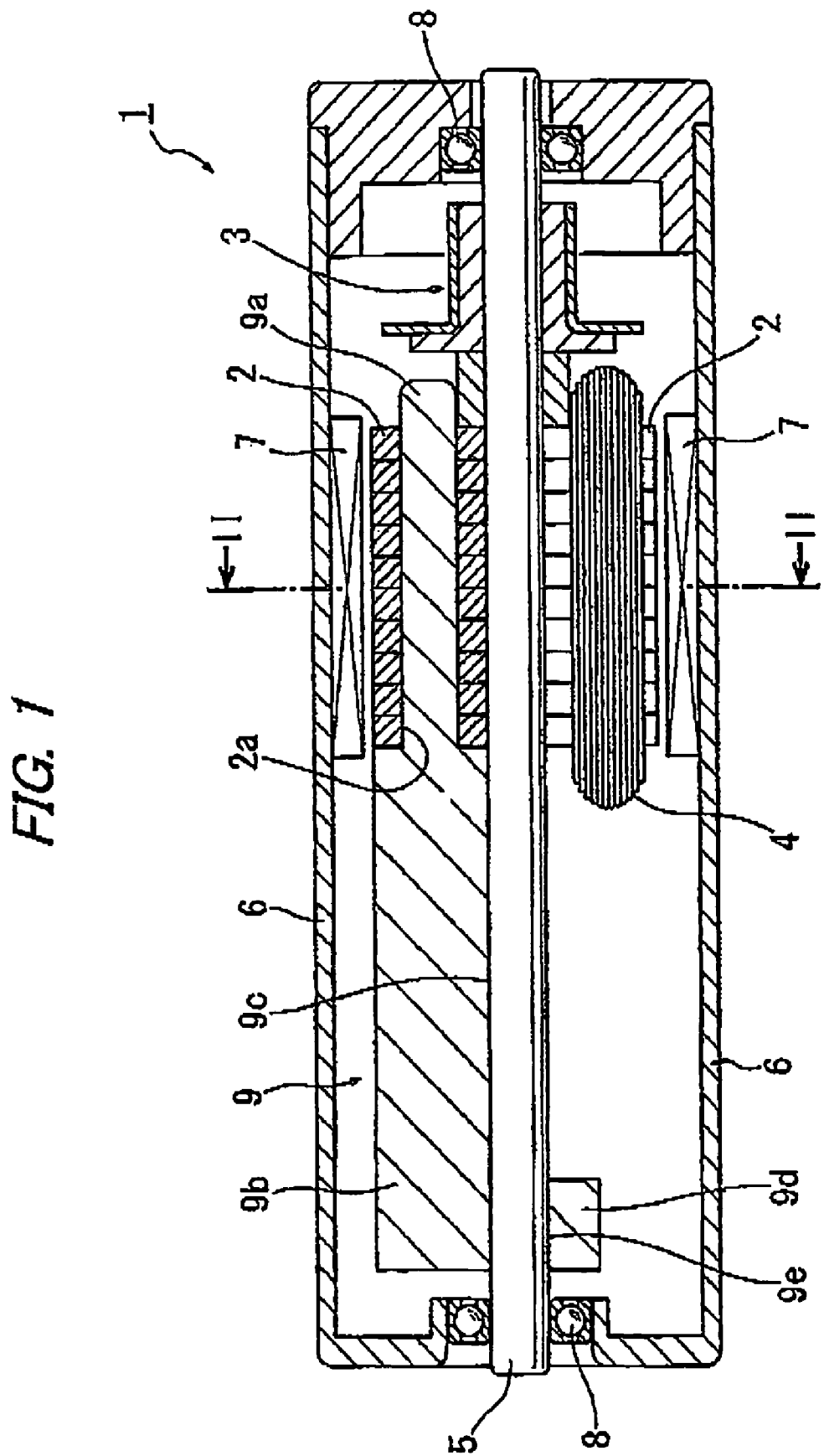
FIG. 1 is a schematic axial cross-sectional view of a motor with a commutator according to a first embodiment of the present invention.

FIG. 1 is a schematic axial cross-sectional view of the motor with a commutator (hereinafter referred to simply as "motor" as appropriate) 1 according to the first embodiment of the present invention.

Figure 2:
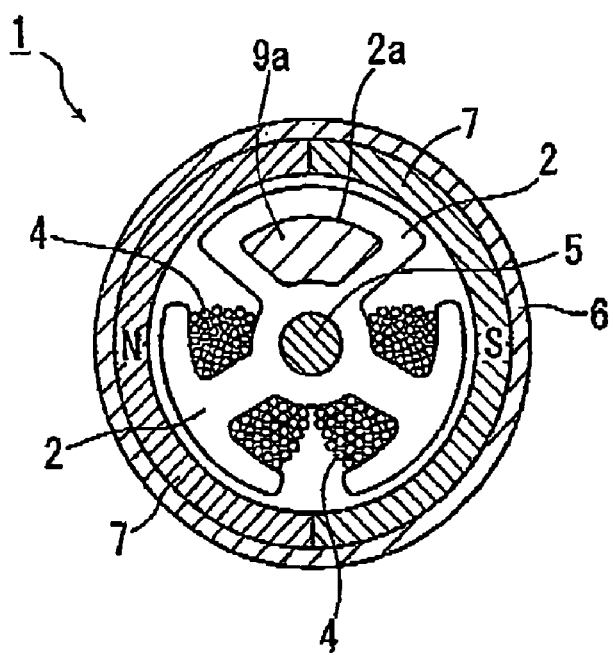
FIG. 2 is a schematic radial cross-sectional view of the motor with a commutator, taken from line I-I of FIG. 1.

FIG. 2 is a schematic radial cross-sectional view of the motor 1 shown in FIG. 1, taken from line I-I of FIG. 1.

In the motor 1, a commutator unit 3 and an armature core 2 are mounted on a rotary shaft 5 thereby constituting a rotor as a whole. The rotary shaft 5 is detachably disposed and rotatably supported via bearings 8 attached to a frame 6. Magnets 7 are attached to the frame 6 thereby constituting a stator as a whole.

The armature core 2 is configured such that a required number of magnetic plates each having punched three salient poles are stacked on one another, and only two out of the three salient poles are each wound with an armature coil 4. While the present invention does not depend on the number of poles of the motor, the above described three-pole motor is used as an example in this embodiment. One pole, out of the three poles, is not wound with the armature coil 4 and has a shape and structure different from those of other poles, that is, one hollow 2a is formed in the pole not provided with the armature coil 4.

Figure 3:
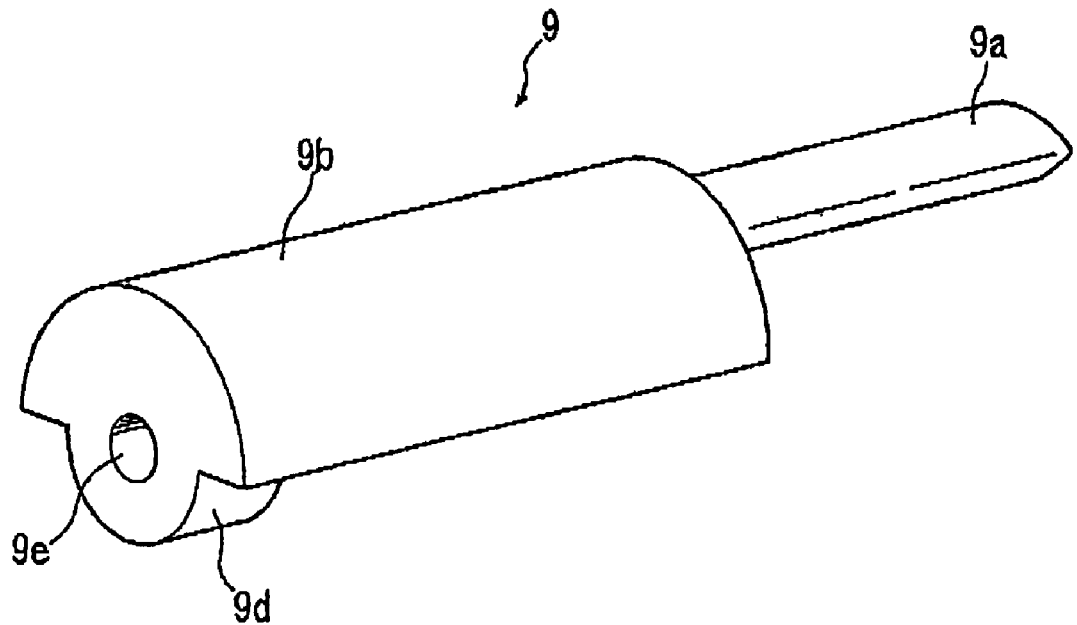
FIG. 3 is a perspective view of a weight shown in FIG. 1, seen from above.
Figure 4:
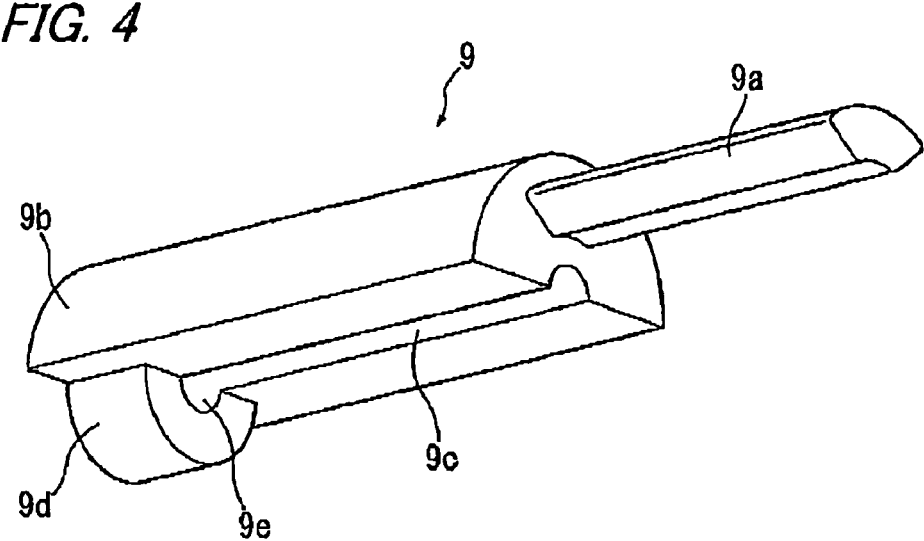
FIG. 4 is a perspective view of the weight shown in FIG. 1, seen from below.
Figure 5:
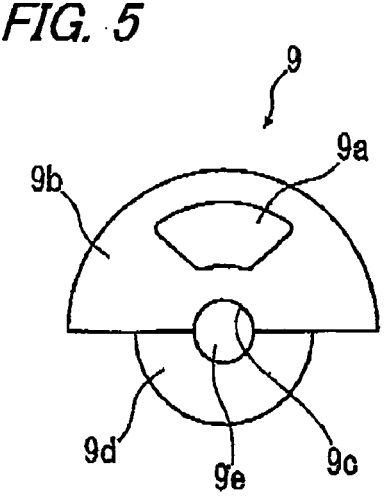
FIG. 5 is a side view of the weight shown in FIG. 1, seen from a projection thereof.

FIGS. 3 and 4 are perspective views of a weight 9 shown in FIG. 1, seen from above and below, respectively, and FIG. 5 is a side view of the weight 9. Referring to FIGS. 3, 4 and 5, the weight 9, which is configured to be weighted eccentrically with respect to the rotary shaft 5, integrally includes: a main body 9b shaped substantially semi-cylindrical; a main body holding block 9d shaped substantially semi-cylindrical, disposed so as to have its flat surface integrally communicating with a flat surface of the main body 9d and having a smaller radius and a smaller axial length than the main body 9b; and a projection 9a extending axially from an axial end of the main body portion 9b. The main body 9b has a Japanese folding fan-like cross section, has a radius substantially equal to a radius of the armature core 2 and has its center coinciding substantially with a center of the rotary shaft 5. The projection 9a is inserted in the hollow 2a of the armature core 2 and the weight 9 is thereby secured to the armature core 2.

A through-hole 9e is formed to axially extend and to be radially centered at a portion where the main body 9b communicates with the main body holding block 9d, and the rotary shaft 5 is penetrated through the through-hole 9e. A groove 9c is formed to axially extend at the flat surface of the main body 9b, and the rotary shaft 5 is guided along the groove 9c.

A material for the weight 9 is determined by giving priority to a specific gravity of the material and the weight 9 is formed by sintering or MIM (Metal Injection Molding) process on, for example, a tungsten alloy.

The weight 9 is attached to the motor 1 in a manner that the rotary shaft 5 is penetrated through the through-hole 9e, and the projection 9a is inserted into the hollow 2a of the armature core 2 so as to come into contact with the axial end of the armature core 2. The weight 9 may be secured to the rotary shaft 5 by press-fitting the rotary shaft 5 into the through-hole 9e. Alternatively, the weight 9 may be secured to the rotary shaft 5 by caulking the weight 9 after inserting the rotary shaft 5 into the through-hole 9e.

Figure 6A:
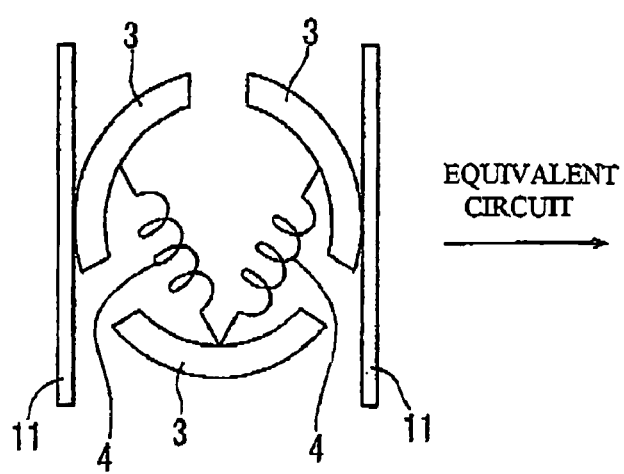
FIGS. 6A and 6B are diagrams to explain a V-connection of an armature coil for the motor with a commutator shown in FIG. 1, wherein FIG. 6A schematically shows a state where brushes are in touch with commutator units
Figure 6B:
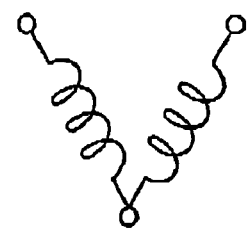

The armature coil 4 is wound around only two poles out of the three poles of the salient poles to realize V-connection. FIGS. 6A and 6B are diagrams to explain the V-connection of the armature coil 4 for the motor 1 shown in FIG. 1, wherein FIG. 6A schematically shows a state where brushes are in touch commutators and FIG. 6B shows an equivalent circuit corresponding to the connection state.

In the V-connection, the armature coils 4 are connected to commutator units 3 and brushes 11 are disposed in touch with the commutator units 3 as shown in FIG. 6A.

In the motor 1 of the first embodiment of the present invention, the shape of the armature core 2 disposed in a manner to face the magnets 7 is the same as a shape of a conventional armature core in which coil is wound around all of three poles thereof. Accordingly, the motor 1 has an advantageous effect that a cogging torque is not increased. Further, in the motor 1 of the first embodiment, the salient pole having the hollow 2a into which the projection 9a of the weight 9 is inserted is not wound with the armature coil 4. Accordingly, the motor 1 has another advantageous effect that not only the number of winding processes but also the amount of magnet wires is reduced.

Second Embodiment

Figure 7:
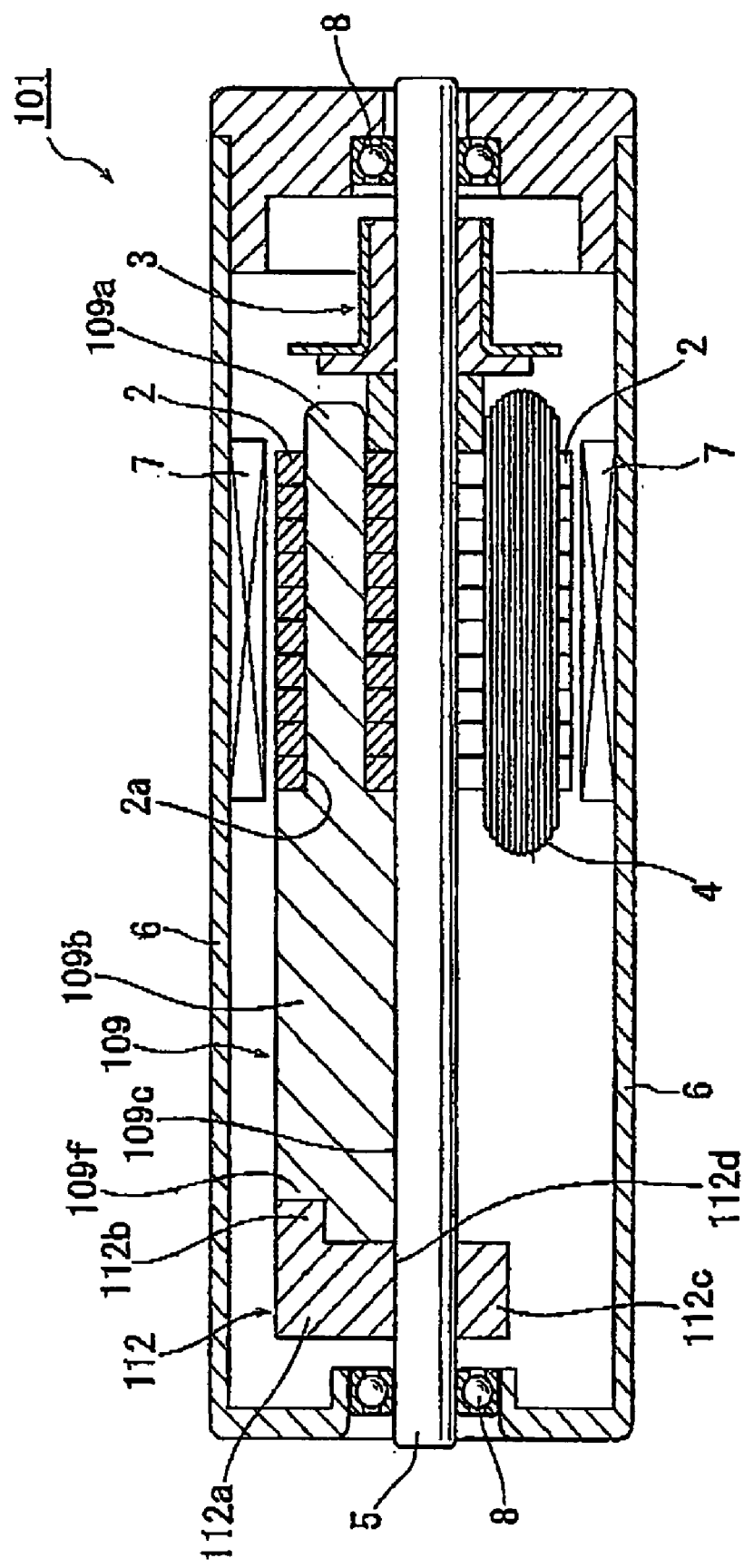
FIG. 7 is a schematic axial cross-sectional view of a motor with a commutator according to a second embodiment of the present invention.
Figure 8:
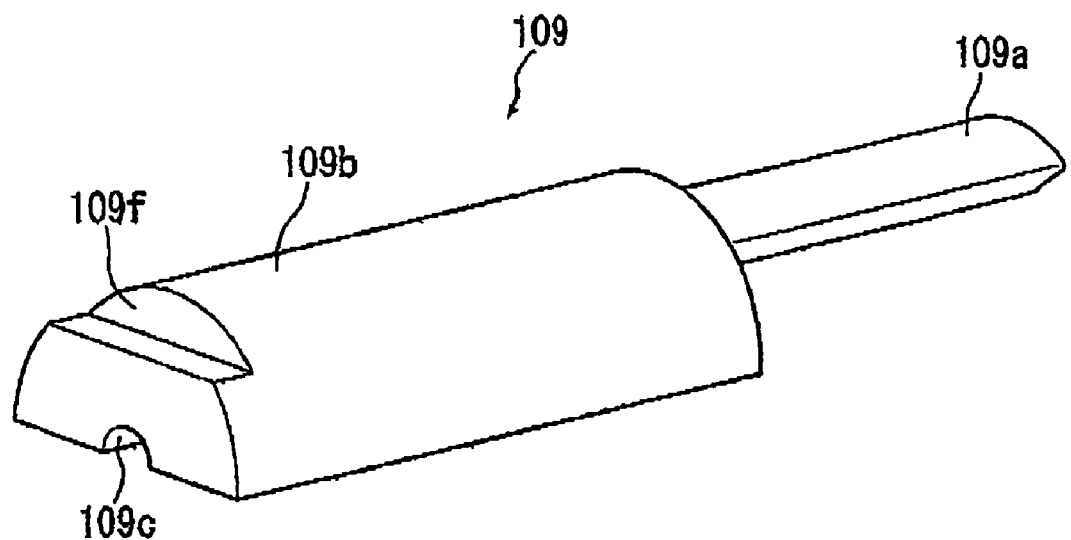
FIG. 8 is a perspective view of a weight of FIG. 7 seen from above.
Figure 9:
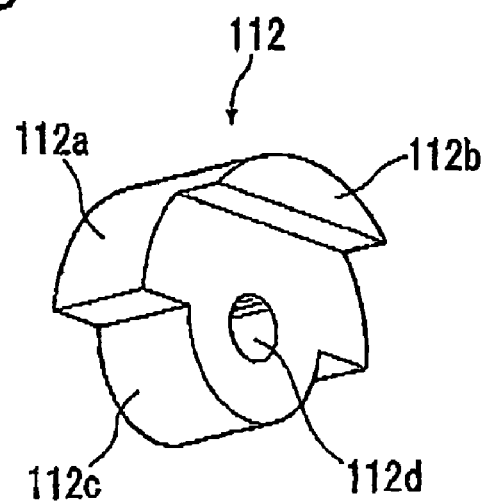
FIG. 9 is a perspective view of a first weight holding member shown in FIG. 7 seen from below.

Next, referring to FIGS. 7 through 9, description proceeds to a motor with a commutator as a vibration motor according to a second embodiment of the present invention.

FIG. 7 is a schematic axial cross-sectional view of the motor with a commutator 101 according to the second embodiment of the present invention.

In the second embodiment, components similar to those of the first embodiment are designated by like reference numerals and their detailed descriptions are omitted accordingly.

According to the second embodiment, a weight 109 serving as an eccentric weight to vibrate the motor 101 is secured to the rotary shaft 5 not by itself but by means of a weight holding member 112 provided separately from the weight 109.

FIG. 8 is a perspective view of the weight 109 shown in FIG. 7 seen from above, and FIG. 9 is a perspective view of the weight holding member 112 shown in FIG. 7 seen from below.

Referring to FIG. 8, the weight 109 includes a semi-cylindrical main body (corresponding to the main body 9b of the first embodiment) 109b which has on its flat surface an axially extending groove 109c along which the rotary shaft 5 is guided, and a projection 109a extending axially from an axial end of the main body 109b. The main body 109b has a Japanese folding fan-like cross section, has a radius substantially equal to a radius of the armature core 2 and has its center approximately coinciding with a center of the rotary shaft. A notched portion 109f is formed at the arc edge of the main body 109b.

A material for the weight 109 is determined by giving priority to a specific gravity of the material and the weight 109 is formed by sintering or MIM processes on, for example, a tungsten alloy.

Referring to FIG. 9, the weight holding member 112 integrally includes: a large radius semi-cylindrical portion 112a; a small radius semi-cylindrical portion 112c having its flat surface integrally communicates a flat surface of the large radius semi-cylindrical portion 112a; and a boss 112b extending axially from an axial end of the large radius semi-cylindrical portion 112a. A through-hole 112d is formed to axially extend and to be radially centered at a portion where the large radius semi-cylindrical portion 112a communicates with the small semi-cylindrical portion 112c, and the rotary shaft 5 is penetrated through the through-hole 112d.

The weight holding member 112 can be made of a material having a small specific gravity and is formed by sintering or MIM process on, for example, steel, copper, or an alloy thereof.

The projection 109a of the weight 109 is inserted into the hollow 2a of the armature core 2 so as to be in contact with the axial end of the armature core 2, and the rotary shaft 5 is penetrated and pushed through the through-hole 112d of the weight holding member 112 thereby allowing the boss 112b of the weight holding member 112 to be geared to the notched portion 109f of the weight 109, and thus the weight holding member 112 is press-fitted to the weight 109. Alternatively, the weight 109 may be secured to the weight holding member 112 by caulking the weight holding member 112 after the weight holding member 112 is geared to the weight 109.

As a result, the weight 109 is secured to the rotary shaft 5 by the boss 112d of the weight holding member 112 being geared to the notched portion 109 of the weight 109.

According to the motor 101 of the second embodiment, the weight 109 has a simple structure compared with the weight 9 of the first embodiment due to no through-hole formed therein. The motor 101 of the second embodiment therefore has an advantageous effect that the weight 109 can be readily produced.

The weight holding member 112 requiring the through-hole 112d through which the rotary shaft 5 is penetrated is different in function and separated from the weight 109. The weight holding member 112 can therefore be made of a material different from that of the weight 109. This extends a range of choice of the material. In other words, since a proportion of mass as a requirement for the weight holding member 112 is small, the weight holding member 112 can also be made of a material having a small specific gravity such as steel, copper, an alloy thereof, and the like.

The material having a small specific gravity such as steel, copper, an alloy thereof and the like is small in hardness, compared with a tungsten alloy. Therefore, a load can be reduced which is imposed on the weight holding member 112 when it is caulked to be secured to the rotary shaft 5. Consequently, stress imposed on the rotary shaft 5 also is reduced. As a result, a problem that the rotary shaft 5 is bent at the caulking process is not easily caused to occur. Accordingly, a yield of the motor 101 can be improved.

Moreover, although the motor 101 of the second embodiment requires the weight holding member 112 as an additional component, the weight holding member 112 has a small axial length and therefore can be readily formed by sintering or MIM (Metal Injection Molding) process on the material thereof.

In the motor 101 of the second embodiment of the present invention, the shape of the armature core 2 disposed in a manner to face the magnets 7 is the same as a shape of a conventional armature core in which coil is wound around all of three poles thereof. Accordingly, the motor 101 has an advantageous effect that a cogging torque is not increased.

In the interim, in the conventional motor in which the eccentric weight is secured externally using only the rotary shaft, it is necessary to increase the load on the eccentric weight, for example, when caulking the eccentric weight to be secured to the rotary shaft in order to prevent the eccentric weight from free wheeling during the rotation of the rotary shaft. On the other hand, in the motor 101 of the second embodiment, the projection 109a of the weight 109 is inserted into the hollow 2a of the armature core 2, and the weight 109 can thereby be prevented from free wheeling. The load imposed on the weight 109 can be decreased, when the weight 109 is caulked to be secured to the rotary shaft 5. As a result, the rotary shaft 5 is hard to bend; when the weight 109 is secured to the rotary shaft 5. Accordingly, a yield of the motor 101 can be improved.

Further, in the motor 101 of the second embodiment, the salient pole having the hollow 2a through which the projection 109a of the weight 109 is inserted is not wound with the armature coil 4. Accordingly, the motor 101 has another advantageous effect that not only the number of winding processes but also the amount of magnet wires is reduced.

Third Embodiment

Figure 10:
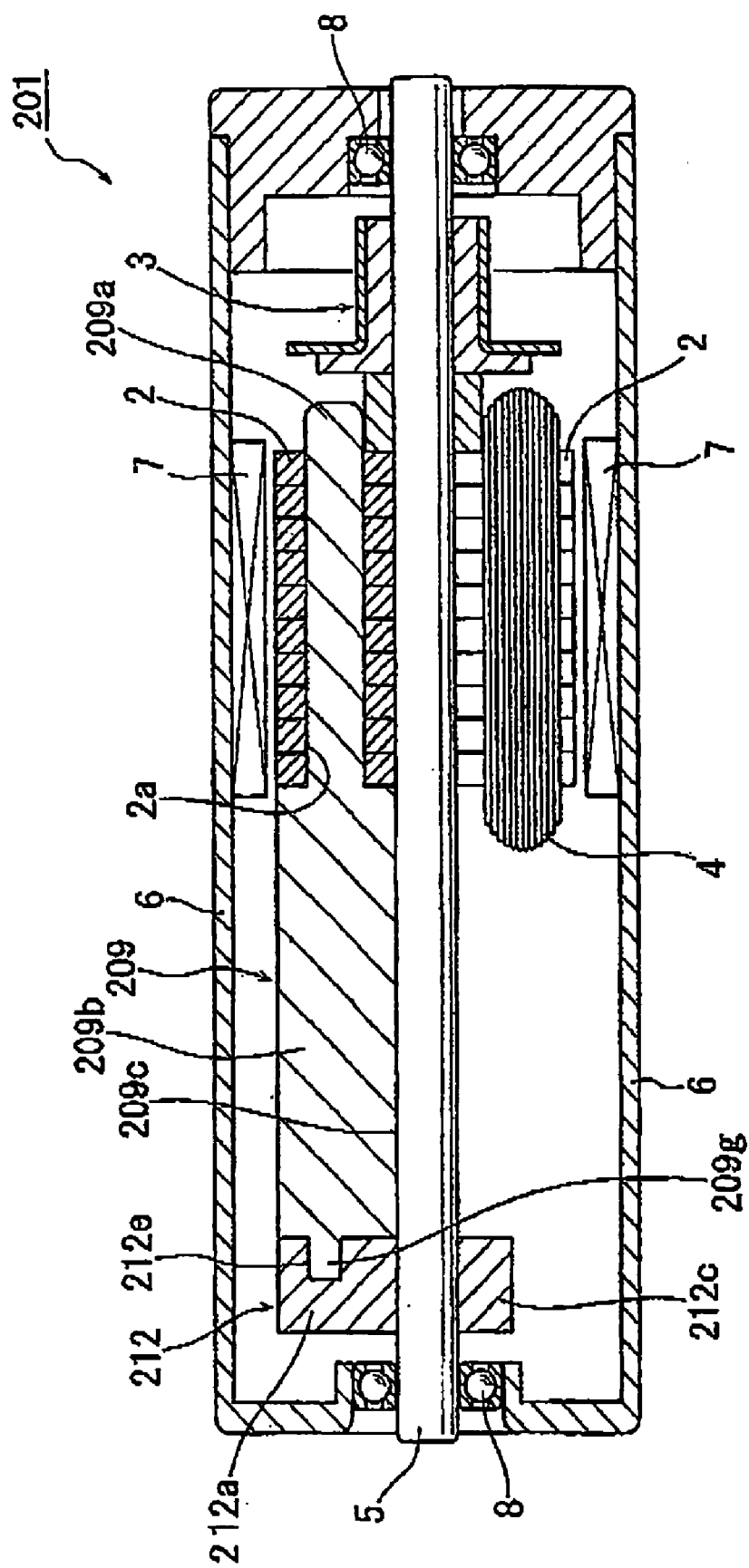
FIG. 10 is a schematic axial cross-sectional view of a motor with a commutator according to a third embodiment of the present invention.
Figure 11:
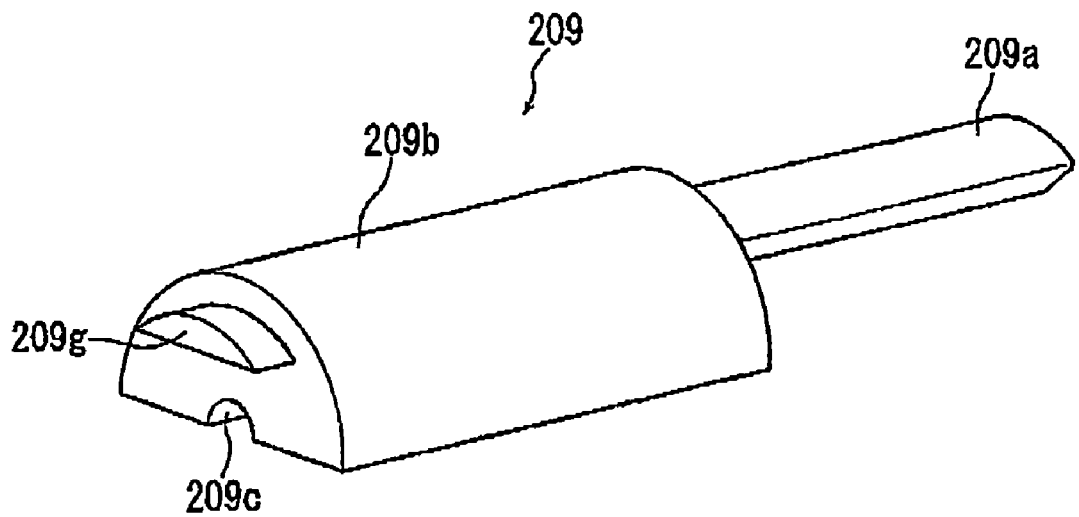
FIG. 11 is a perspective view of a weight of FIG. 10 seen from above.
Figure 12:
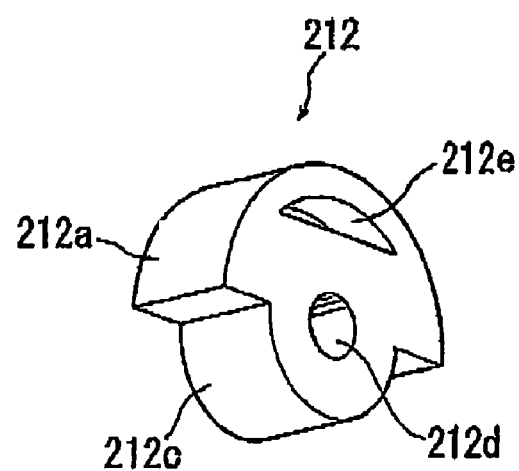
FIG. 12 is a perspective view of a first weight holding member shown in FIG. 10 seen from below.

Next, referring to FIGS. 10 through 12, description proceeds to a motor with a commutator as a vibration motor according to a third embodiment of the present invention.

FIG. 10 is a schematic axial cross-sectional view of the motor with a commutator according to the third embodiment of the present invention.

In the third embodiment, components similar to those of the first embodiment are designated by like reference numerals and their detailed descriptions are omitted accordingly.

According to the third embodiment, a weight 209 serving as an eccentric weight to vibrate a motor 201 is secured to the rotary shaft 5 not by itself but by means of a weight holding member 212 provided separately from the weight 209.

FIG. 11 is a perspective view of the weight 209 shown in FIG. 10 seen from above, and FIG. 12 is a perspective view of the weight holding member 212 shown in FIG. 10 seen from below.

A material for the weight 209 is determined by giving priority to a specific gravity of the material and the weight 209 is formed by sintering or MIM processes on, for example, a tungsten alloy.

Referring to FIG. 11, the weight 209 includes: a semi-cylindrical main body (corresponding to the main body 9b of the first embodiment) 209b having on its flat surface an axially extending groove 209c along which the rotary shaft 5 is guided; a projection 209a disposed on an axial end of the semi-cylindrical main body 209b; and a boss 209g formed at the other axial end of the semi-cylindrical main body 209b. The semi-cylindrical main body portion (large-diameter portion) 209b has a Japanese folding fan-like cross section, has a radius substantially equal to a radius of the armature core 2 and has its center approximately coinciding with a center of the rotary shaft 5.

Referring to FIG. 12, the weight holding member 212 includes a large radius semi-cylindrical portion 212a and a small radius semi-cylindrical portion 212c. A through-hole 212d is formed to axially extend and to be radially centered at a portion where the large radius semi-cylindrical portion 212a communicates with the small semi-cylindrical portion 212c, and the rotary shaft 5 is penetrated through the through-hole 212d. Also, a recessed portion 212e having a cross section corresponding to and slightly larger than a cross section of the boss 209g of the weight 209 is formed at an axial end of the large radius semi-cylindrical portion 212a.

The projection 209a of the weight 209 is inserted into the hollow 2a of the armature core 2 so as to be in contact with the axial end of the armature core 2, and the rotary shaft 5 is penetrated and pushed through the through-hole 212d of the weight holding member 212 thereby engaging the recessed portion 212e of the weight holding member 212 with the boss 209g of the weight 209, and thus the weight holding member 212 is press-fitted to the weight 209. Alternatively, the weight holding member 212 may be press-fitted to the weight 209 by caulking the weight holding member 212 after the weight holding member 212 is geared to the weight 209.

As a result, the weight 209 is secured to the rotary shaft by the recessed portion 212 of the weight holding member 212 engaging with the boss 209g of the weight 209.

According to the motor 201 of the third embodiment, the weight 209 has a simple structure compared with the weight 9 of the first embodiment due to no through-hole formed therein. The motor 201 of the third embodiment therefore has an advantageous effect that the weight 209 can be readily produced.

The weight holding member 212 requiring the through-hole 212d through which the rotary shaft 5 is penetrated is different in function and separated from the weight 209. The weight holding member 212 can therefore be made of a material different from that of the weight 209. This extends a range of choice of the material. In other words, since a proportion of mass as a requirement for the weight holding member 212 is small, the weight holding member 212 can also be made of a material having a small specific gravity such as steel, copper, an alloy thereof, and the like.

The material having a small specific gravity such as steel, copper, an alloy thereof and the like is small in hardness, compared with a tungsten alloy. Therefore, a load can be reduced which is imposed on the weight holding member 212 when it is caulked to be secured to the rotary shaft 5. Consequently, stress imposed on the rotary shaft 5 also is reduced. As a result, a problem that the rotary shaft 5 is bent at the caulking process is not easily caused to occur. Accordingly, a yield of the motor 101 can be improved.

Moreover, although the motor 201 of the third embodiment requires the weight holding member 212 as an additional component, the weight holding member 212 has a small axial length and therefore can be readily formed by sintering or MIM (Metal Injection Molding) process on the material thereof.

In the motor 201 of the third embodiment of the present invention, the shape of the armature core 2 disposed in a manner to face the magnet 7 is the same as a shape of a conventional armature core in which coil is wound around all of three poles thereof. Accordingly, the motor 201 has an advantageous effect that a cogging torque is not increased.

In the interim, in the conventional motor in which the eccentric weight is secured externally using only the rotary shaft, it is necessary to increase the load on the eccentric weight, for example, when caulking the eccentric weight to be secured to the rotary shaft in order to prevent the eccentric weight from free wheeling during the rotation of the rotary shaft. On the other hand, in the motor 201 of the third embodiment, the projection 209a of the weight 209 is inserted into the hollow 2a of the armature core 2, and the weight 209 can thereby be prevented from free wheeling. The load imposed on the weight 209 can be decreased, when the weight 209 is caulked to be secured to the rotary shaft 5. As a result, the rotary shaft 5 is hard to bend, when the weight 209 is secured to the rotary shaft 5. Accordingly, a yield of the motor 201 can be improved.

Further, in the motor 201 of the third embodiment, the salient pole having the hollow 2a through which the projection 209a of the weight 209 is inserted is not wound with the armature coil 4. Accordingly, the motor 201 has another advantageous effect that not only the number of winding processes but also the amount of magnet wires is reduced.

Fourth Embodiment

Figure 13:
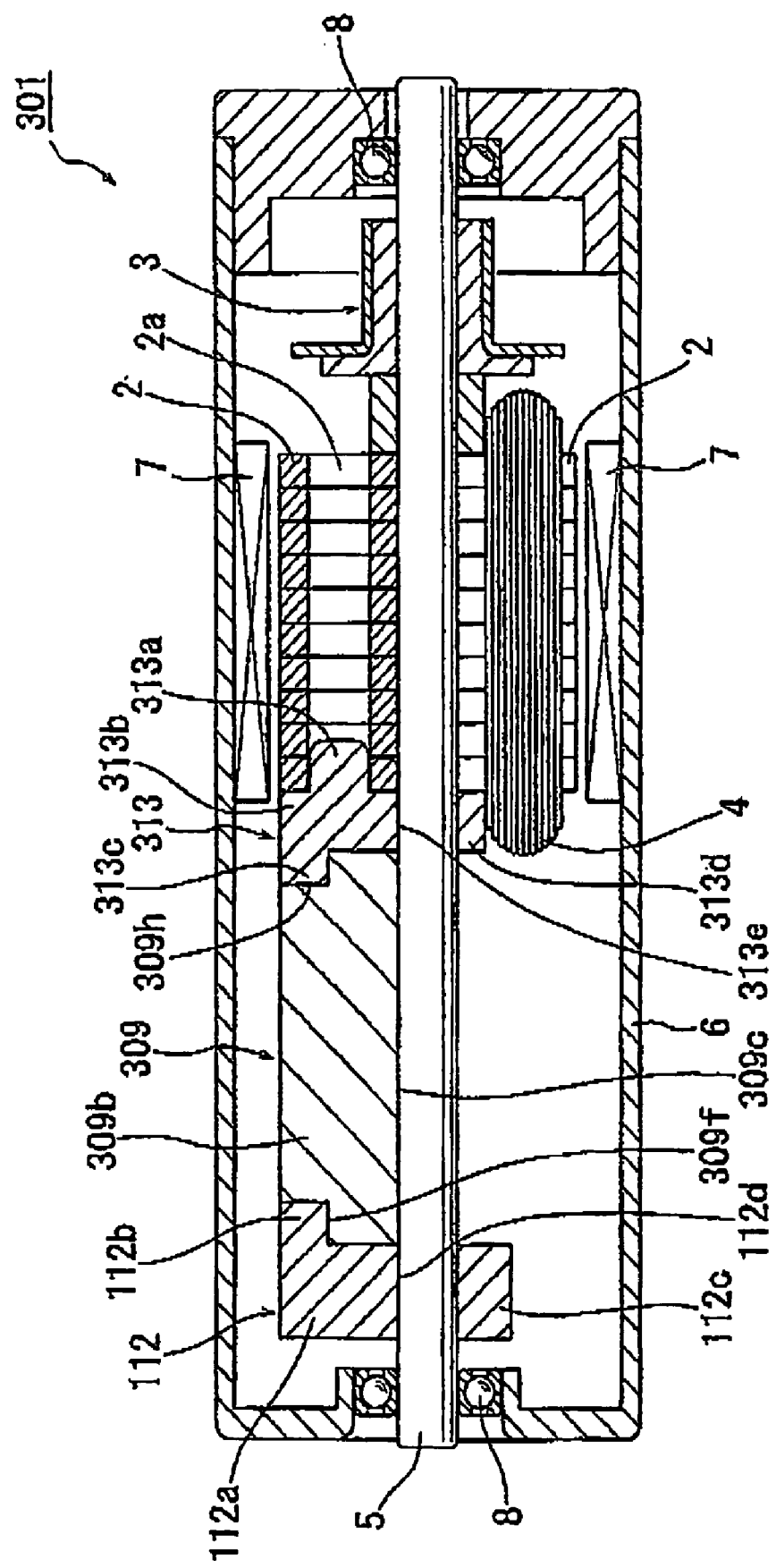
FIG. 13 is a schematic axial cross-sectional view of a motor with a commutator according to a fourth embodiment of the present invention.
Figure 14:
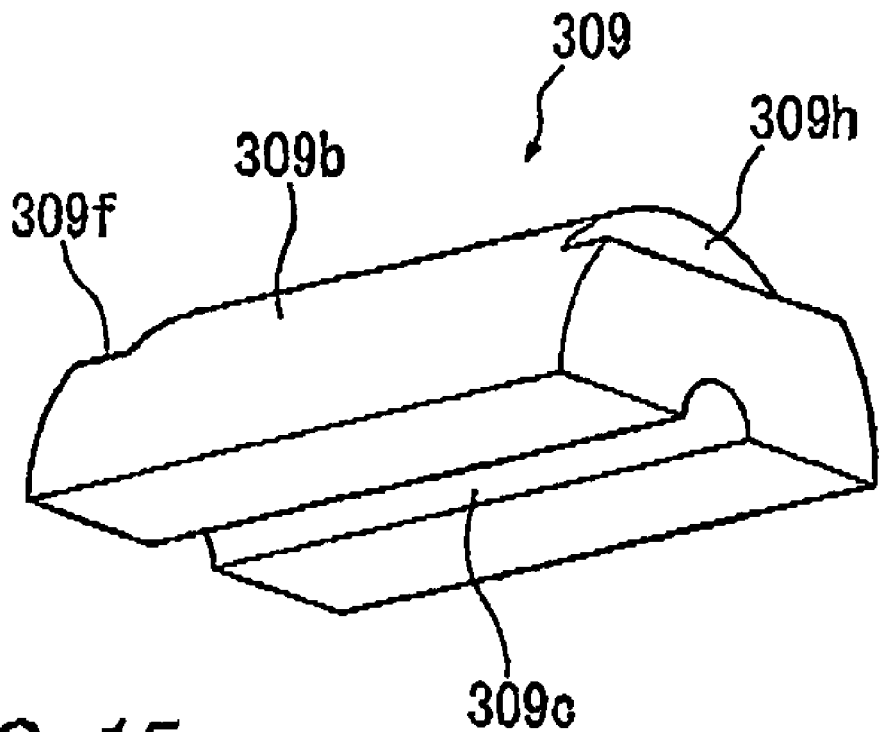
FIG. 14 is a perspective view of a weight of FIG. 13 seen from above.
Figure 15:
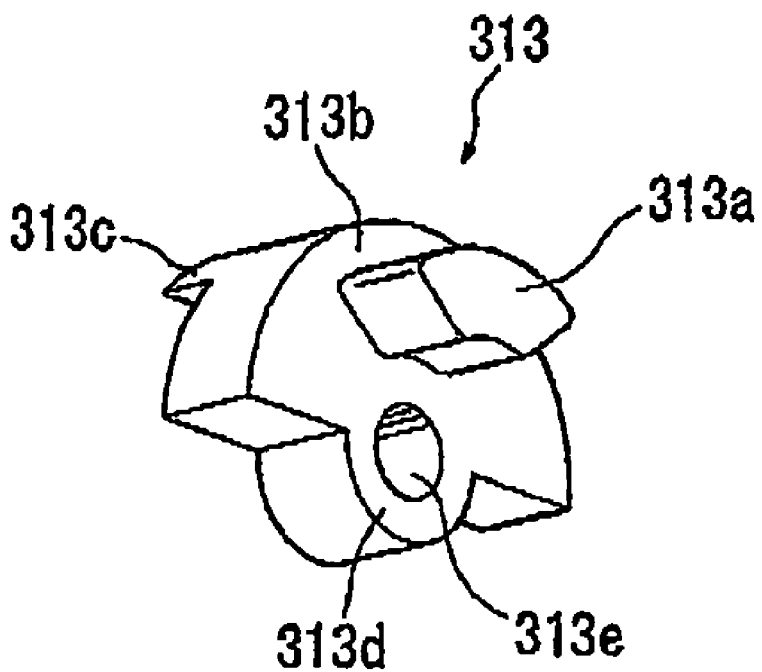
FIG. 15 is a perspective view of a second weight holding member of FIG. 13 seen from below.

Next, referring to FIGS. 13 through 15, description proceeds to a motor with a commutator as a vibration motor according to a fourth embodiment of the present invention.

FIG. 13 is a schematic axial cross-sectional view of the motor with a commutator according to the fourth embodiment of the present invention.

In the fourth embodiment, components similar to those of the first and the second embodiments are designated by like reference numerals and their detailed descriptions are omitted accordingly.

According to the fourth embodiment, a weight 309 serving as an eccentric weight to vibrate a motor 301 is secured to the rotary shaft 5 not by itself but by means of (first) weight holding member 112 provided separately from the weight 309. Further, the weight 309 is not directly secured to the armature core 2 by itself but via another (second) weight holding member 313 interposed between the weight 309 and the armature core 2.

FIG. 14 is a perspective view of the weight 309 shown in FIG. 13 seen from above, and FIG. 15 is a perspective view of the second weight holding member 313 shown in FIG. 13 seen from below. In this connection, the first weight holding member 112 of this embodiment is structured the same as the weight holding member 112 in the second embodiment and therefore has the same reference numerals.

A material for the weight 309 is determined by giving priority to a specific gravity of the material and the weight 309 is formed by sintering or MIM processes on, for example, a tungsten alloy.

The weight 309 includes a substantially semi-cylindrical main body 309b having on its flat surface an axially extending groove 309c along which the rotary shaft 5 is guided. A notched portion 309f is formed at the arc edge at one axial end of the main body 309b and geared to a boss 112b of the first weight holding member 112. A notched portion 309h is formed at the arc edge at the other axial end of the main body 809b. The main body 309b of the weight 809 has a Japanese folding fan-like cross section, has a radius substantially equal to a radius of the armature core 2 and has its center approximately coinciding with a center of the rotary shaft 5.

The second weight holding member 313 integrally includes: a large radius semi-cylindrical portion 313b; a small radius semi-cylindrical portion 313d wherein a through-hole 313 is formed to axially extend and to be radially centered at a portion where respective flat surfaces of the large and small radius semi-cylindrical portions 313b and 313b communicate with each other; a boss 313c disposed at the arc edge at one axial end of the large radius semi-cylindrical portion 313b; and a boss 313a disposed at the other axial end of the large radius semi-cylindrical portion 313b. The boss 313a of the second weight holding member 313 is to be inserted into the hollow 2a of the armature core 2 thereby securing the second weight holding member 313 to the armature core 2, while the boss 313c is to be geared to the notched portion 309h of the weight 309.

The second weight holding member 14 can be made of a material having a small specific gravity and is formed by sintering or MIM process on, for example, steel, copper, or an alloy thereof.

The rotary shaft 5 is penetrated through the through-hole 313e of the second weight holding member 313, the boss 313a of the second weight holding member 313 is inserted into the hollow 2a of the armature core 2 so as to be in contact with the axial end of the armature core 2, then the weight 309 is pushed toward the second weight holding portion 313 with the groove 309c guiding the rotary shaft 5 thereby gearing the notched portion 309h of the weight 309 to the boss 313c of the second weight holding member 313, further the rotary shaft 5 is penetrated through the through-hole 112d of the first weight holding member 112, and finally the first weight holding member 112 is pushed toward the weight 309 thereby gearing the boss 112b of the first weight holding member 112 to the notched portion 309f of the weight 309 thus pressfitting the first weight holding member 112 to the weight 309. Alternatively, the first weight holding member 112 may be secured to the weight 309 by caulking the weight holding member 112 after the weight holding member 112 is geared to the weight 309.

As a result, the weight 309 is secured to the armature core 2 via the second weight holding member 313 and at the same time secured to the rotary shaft 5 by means of the first and second weight holding members 112 and 313.

According to the motor 301 of the fourth embodiment, it is not necessary to form a through-hole in the weight 309, and so on. the weight 309 has a still simpler structure than the second and third embodiments due to no through-hole nor a projection formed therein. As a result, the motor 301 of the fourth embodiment has an advantageous effect that the weight 309 can be readily produced.

The first and second weight holding members 112 and 313 each of which requires the through-hole through which the rotary shaft 5 is penetrated are different in function and separated from the weight 309, respectively. The first and second weight holding members 112 and 313 can therefore be made of materials different from that of the weight 309. This extends a range of choice of the materials. In other words, since a proportion of mass as a requirement for the first and second weight holding members 112 and 313 is small, the first and second weight holding members 112 and 313 can also be made of a material having small specific gravity such as steel, copper, an alloy thereof, and the like.

The material having a small specific gravity such as steel, copper, an alloy thereof and the like is small in hardness, compared with a tungsten alloy. Therefore, a load imposed on the first and second weight holding members 112 and 313 at the time of being caulked to be secured to the rotary shaft 5 can be reduced. Consequently, stress imposed on the rotary shaft 5 also is small. As a result, a problem that the rotary shaft 5 is bent at the time of being caulked is not easily caused to occur. Accordingly, a yield of the motor 301 can be improved.

Moreover, although the motor 301 of the fourth embodiment requires the weight holding members 112 and 313 as additional components, the first and second weight holding members 112 and 313 have a small axial length and therefore can be readily formed by sintering or MIM (Metal Injection Molding) process on the materials thereof.

In the motor 301 of the fourth embodiment of the present invention, the shape of the armature core 2 disposed in a manner to face the magnets 7 is the same as a shape of a conventional armature core in which coil is wound around all of three poles thereof. Accordingly, the motor 301 has an advantageous effect that a cogging torque is not increased.

In the interim, in the conventional motor in which the eccentric weight is secured externally using only the rotary shaft, it is necessary to increase the load on the eccentric weight, for example, when caulking the eccentric weight to be secured to the rotary shaft in order to prevent the eccentric weight from free wheeling during the rotation of the rotary shaft. On the other hand, in the motor 301 of the fourth embodiment, the boss 313a of the second weight holding member 313 is inserted into and secured in the hollow 2a of the armature core 2 while the weight 309 is pushed radially toward the rotary shaft 5 by the boss 313c of the second weight holding member 313. The weight 309 can thereby be prevented from free wheeling. The load imposed on the weight 309 can be decreased when the weight 309 is caulked to be secured to the rotary shaft 5. As a result, the rotary shaft 5 is hard to bend when the weight 309 is secured to the rotary shaft 5. Accordingly, a yield of the motor 301 can be improved.

Further, in the motor 301 of the fourth embodiment, the salient pole having the hollow 2a through which the boss 313a of the second weight holding member 313 is inserted is not wound with the armature coil 4. Accordingly, the motor 301 has another advantageous effect that not only the number of winding processes but also the amount of magnet wires is reduced.

Fifth Embodiment

Figure 16:
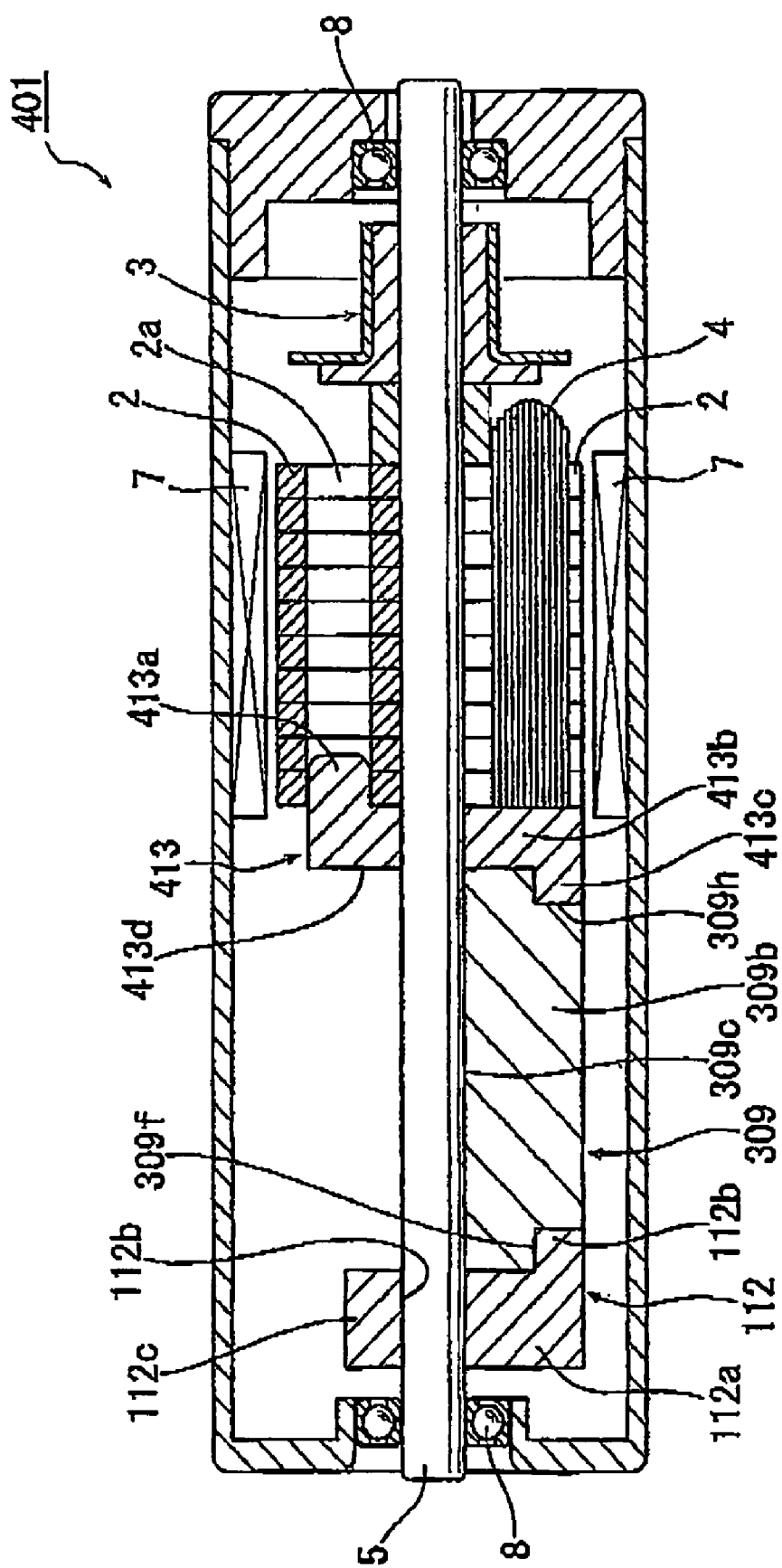
FIG. 16 is a schematic axial cross-sectional view of a motor with a commutator according to a fifth embodiment of the present invention.
Figure 17:
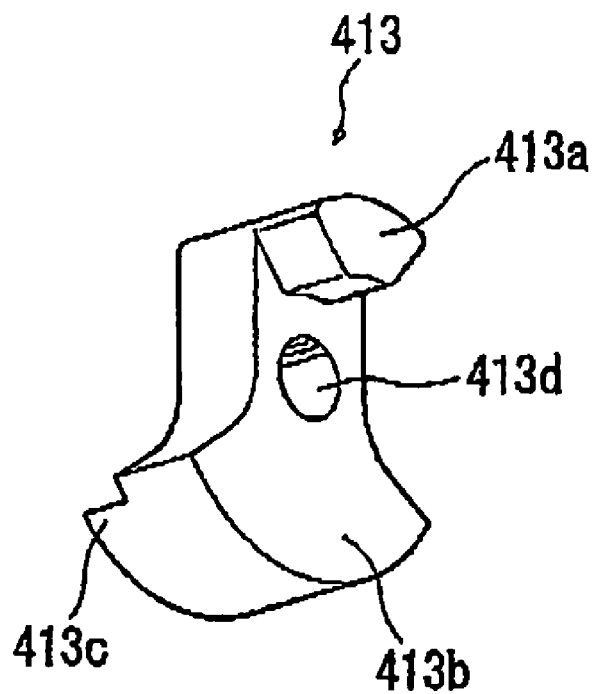
FIG. 17 is a perspective view of a second weight holding member of FIG. 16 seen from below.

Next, referring to FIGS. 16 and 17, description proceeds to a motor with a commutator as a vibration motor according to a fifth embodiment of the present invention.

FIG. 16 is a schematic axial cross-sectional view of the motor with a commutator according to the fifth embodiment of the present invention.

In the fifth embodiment, components similar to those of the first and the second embodiments are designated by like reference numerals and their detailed descriptions are omitted accordingly.

According to the fifth embodiment, a weight 309 serving as an eccentric weight to vibrate a motor 401 is secured to the rotary shaft 5 not by itself but by means of a first weight holding member 112 provided separately from the weight 309. Further, the weight 309 is secured directly to the armature core 2 not by itself but via a second weight holding member 413 interposed between the weight 309 and the armature core 2.

FIG. 17 is a perspective view of the second weight holding member 413 shown in FIG. 16 seen from below. In this connection, the weight 309 of this embodiment is structured the same as the weight 309 of the fourth embodiment, and also the first weight holding member 112 of this embodiment is structured the same as the first weight holding member 112 of the second embodiment.

The second weight holding member 413 can be made of a material having a small specific gravity and is formed by sintering or MIM process on, for example, steel, copper, or an alloy thereof.

The second weight holding member 413 integrally includes: a main body 413b formed in a segmented cylinder having a Japanese folding fan-like cross section defining a smaller angle than 180 degrees; a square portion disposed to extend radially from a center of the segmented cylinder; a boss 413a disposed at an axial end of the square portion; and another boss 413c disposed at an axial end of the main body 413b facing in the direction opposite to the axial end of the square portion having the boss 413a wherein the two bosses 413a and 413c are positioned circumferentially opposite to each other.

The boss 413a is inserted into the hollow 2a of the armature core 2 thereby securing the second weight holding member 413 to the armature core 2. The boss 413c is geared to the notched portion 309h of the weight 309. Further, a through-hole 413d is formed at a portion where the main body 418b communicates with the square portion, and the rotary shaft 5 is penetrated through the through-hole 413d.

The rotary shaft 6 is penetrated through the through-hole 413d of the second weight holding member 413, the boss 413a of the weight holding member 413 is inserted into the hollow 2a of the armature core 2 so as to be in contact with the axial end of the armature core 2, then the weight 309 is pushed toward the second weight holding member 413 thereby gearing the notched portion 309h of the weight 309 to the boss 413c of the second weight holding member 413, and further the rotary shaft 5 is penetrated through the through-hole 112d of the first weight holding member 112 and pushed toward the weight 309 thereby gearing the boss 112b of the first weight holding member 112 to the notched portion 309f of the weight 309 thus press-fitting the first weight holding member 112 to the weight 309 Alternatively, the first weight holding member 112 may be secured to the weight 309 by caulking the weight holding member 112 after the second weight holding member 112 is secured to the weight 309.

As a result, the weight 309 is secured to the armature core 2 via the second weight holding member 418 and at the same time is pushed radially to the rotary shaft 5 by means of the boss 112b of the first weight holding member 112 and the boss 413c of the second weight holding member 413.

In the fifth embodiment, the weight 309 is positioned in the same direction circumferentially with respect to the rotary shaft 5 as the salient pole around which the armature coil 4 is wound. Consequently, the armature coil 4 serves as part of the eccentric weight, thus enabling the vibration to be increased.

According to the motor 401 of the fifth embodiment, it is not necessary to form a through-hole in the weight 309, and so on. the weight 309 has a simpler structure than any of the above-described embodiments due to no through-hole formed therein and also to the simpler configuration. As a result, the motor 401 of the fifth embodiment has an advantageous effect that the weight 309 can be readily produced.

The first and second weight holding members 112 and 413 each of which requires the through-hole through which the rotary shaft 5 is penetrated are different in function and separated from the weight 309. The weight holding members 112 and 413 can therefore be made of materials different from that of the weight 309. This extends a range of choice of the materials. In other words, since a proportion of mass as a requirement for the first and second weight holding members 112 and 413 is small, the weight holding members 112 and 413 can be made of a material having small specific gravity such as steel, copper, an alloy thereof, and the like.

The material having a small specific gravity such as steel, copper, an alloy thereof and the like is small in hardness, compared with a tungsten alloy. Therefore, a load can be reduced which is imposed on the first and second weight holding members 112 and 413 when it is caulked to be secured to the rotary shaft 5. Consequently, stress imposed on the rotary shaft 5 also is reduced. As a result, a problem that the rotary shaft 5 is bent at the caulking process is not easily caused to occur. Accordingly, a yield of the motor 401 can be improved.

Moreover, although the motor 401 of the fifth embodiment requires the first and second weight holding members 112 and 413 as additional components, the weight holding members 112 and 413 have a small axial length and therefore can be readily formed by sintering or MIM (Metal Injection Molding) process on the materials thereof.

In the motor 401 of the fifth embodiment of the present invention, the shape of the armature core 2 disposed in a manner to face the magnets 7 is the same as a shape of a conventional armature core in which coil is wound around all of three poles thereof. Accordingly, the motor 401 has an advantageous effect that a cogging torque is not increased.

In the interim, in the conventional motor in which the eccentric weight is secured externally using only the rotary shaft, it is necessary to increase the load on the eccentric weight, for example, when caulking the eccentric weight to be secured to the rotary shaft in order to prevent the eccentric weight from free wheeling during the rotation of the rotary shaft. On the other hand, in the motor 401 of the fifth embodiment, the boss 413a of the second weight holding member 413 is inserted into and secured in the hollow 2a of the armature core 2 while the weight 309 is pushed toward the rotary shaft 5 by the boss 413c of the second weight holding member 413. The weight 309 can thereby be prevented from free wheeling. The load imposed on the weight 309 can be decreased, if the weight 309 is caulked to be secured to the rotary shaft 5. As a result, the rotary shaft 5 is hard to bend when the weight 309 is secured to the rotary shaft 5. Accordingly, a yield of the motor 401 can be improved.

Further, in the motor 401 of the fifth embodiment, the salient pole having the hollow 2a through which the boss 413a of the second weight holding member 413 is inserted is not wound with the armature coil 4. Accordingly, the motor 401 has another advantageous effect that not only the number of winding processes but also the amount of magnet wires is reduced.

Sixth Embodiment

Figure 18:
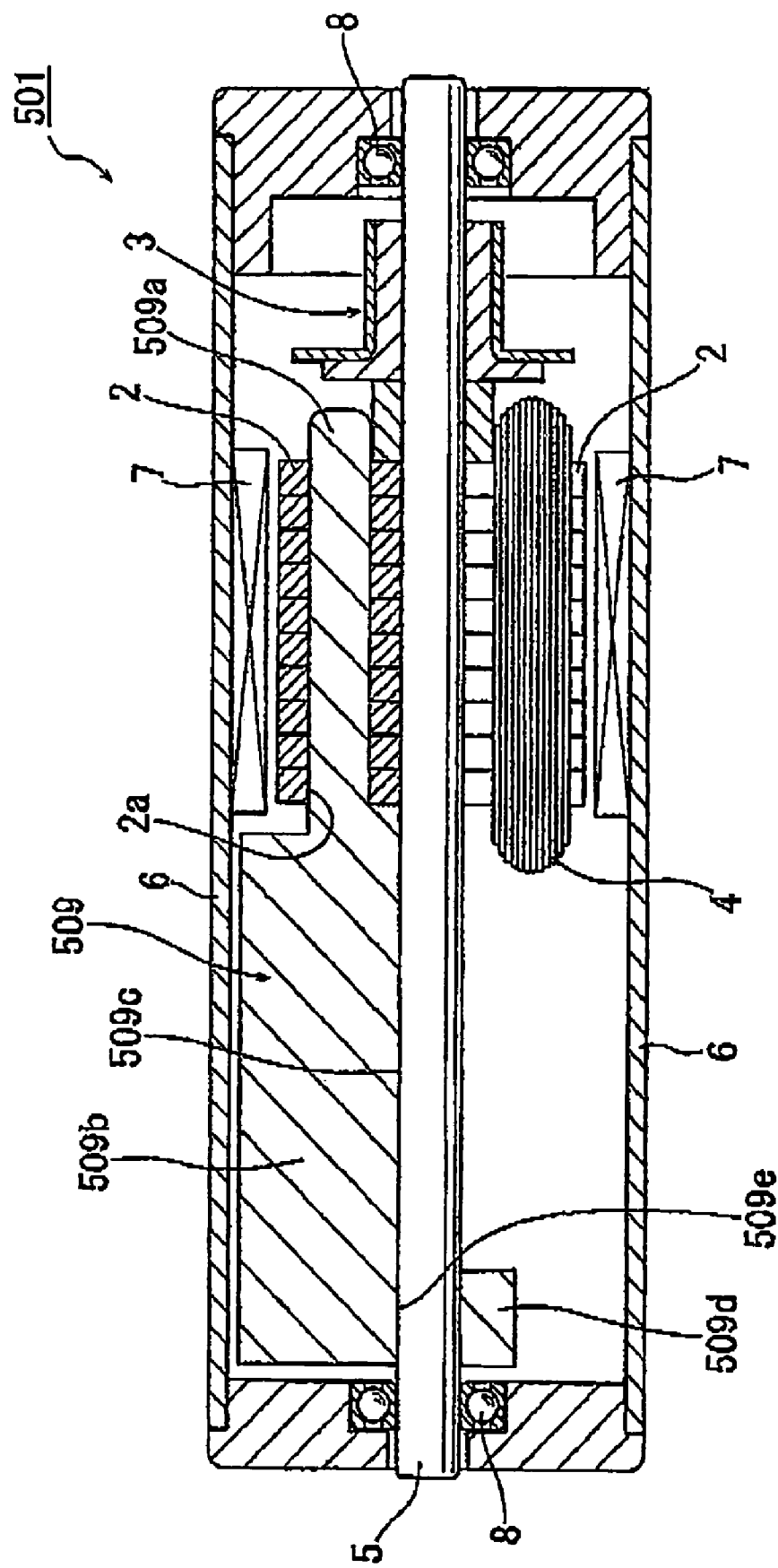
FIG. 18 is a schematic axial cross-sectional view of a motor with a commutator according to a sixth embodiment of the present invention.
Figure 19:
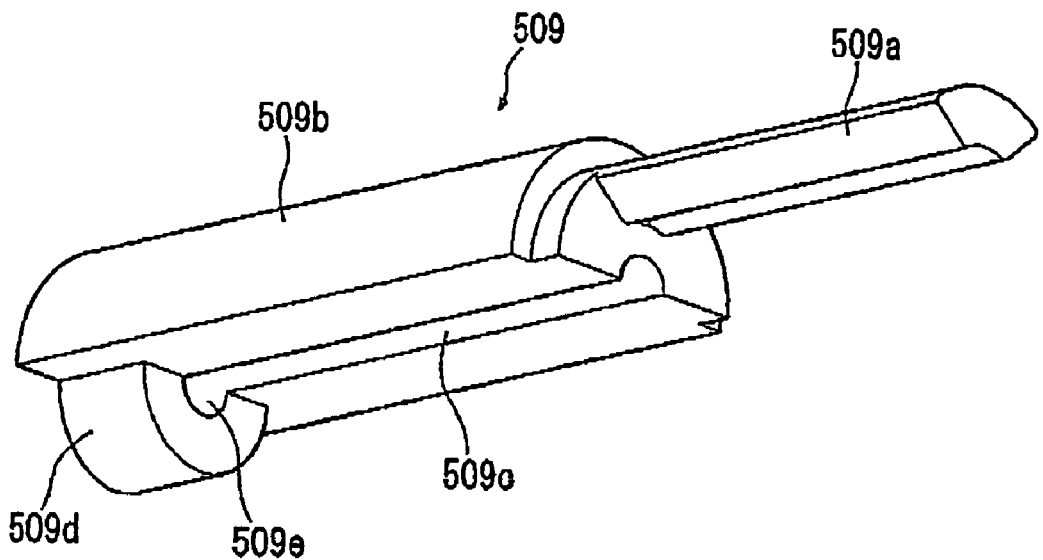
FIG. 19 is a perspective view of a weight shown in FIG. 18 seen from below.

Next, referring to FIGS. 18 and 19, description proceeds to a motor with a commutator as a vibration motor according to a sixth embodiment of the present invention.

FIG. 18 is a schematic axial cross-sectional view of the motor with a commutator according to the sixth embodiment of the present invention.

In the sixth embodiment, components similar to those of the first embodiment are designated by like reference numerals and their detailed descriptions are omitted accordingly.

Referring to FIG. 18, a projection 509a of a weight 509 serving as an eccentric weight to vibrate a motor 501 is inserted into the hollow 2a of the armature core 2 thereby securing the weight 509 to the armature core 2.

FIG. 19 is a perspective view of the weight 509 shown in FIG. 18 seen from below.

A material for the weight 509 is determined by giving priority to a specific gravity of the material and the weight 509 is formed by sintering or MIM processes on, for example, a tungsten alloy.

The weight 509 has a similar structure to the weight 9 of the first embodiment. Referring to FIG. 19, the weight 509 integrally includes: a main body 509b shaped substantially semi-cylindrical; a main body holding block 509d shaped substantially semi-cylindrical, disposed so as to have its flat surface integrally communicating with a flat surface of the main body 509d and having a smaller radius and a smaller axial length than the main body 9b; and a projection 509a extending axially from an axial end of the main body 509b. The main body 509b has a Japanese folding fan-like cross section, has a radius larger than of a circle defined by radially inward surfaces of the magnets 7 and has its center coinciding substantially with a center of the rotary shaft 5. The projection 9a is inserted in the hollow 2a of the armature core 2 and the weight 9 is thereby secured to the armature core 2.

A through-hole 9e is formed to axially extend and to be radially centered at a portion where the main body 9b communicates with the main body holding block 9d, and the rotary shaft 5 is penetrated through the through-hole 9e. A groove 9c is formed to axially extend at the flat surface of the main body 9b, and the rotary shaft 5 is guided along the groove 9c.

In the motor 501 of the sixth embodiment, the outermost radius of the weight 509 is larger than the radius of the inner circumferential plane of the magnets 7. In other words, the radially outermost portion of the weight 509 is made closer to the inner circumferential surface of the frame 6 than in the first embodiment to such an extent that an appropriate gap is still provided from the inner circumferential surface of the frame 6. Thus, the weight 509 is made larger and heavier compared with in the first embodiment and therefore vibration can be increased.

Moreover, needless to say, configurations realized by making the outermost radius of the weight 509 larger than the radius of the inner circumferential plane of the magnets 7 can be applied to any one of the embodiments described above.

In each of the above embodiments, the frame 6 has a circular cross section as shown in FIG. 2, however, the present invention is not limited to this structure and the frame 6 may have an oval cross section. Alternatively, a frame 606 which has a cross section including two flat planes as shown in FIG. 20, may be used as a variation example derived from FIG. 2 and incorporated in a motor 601.

Figure 20:
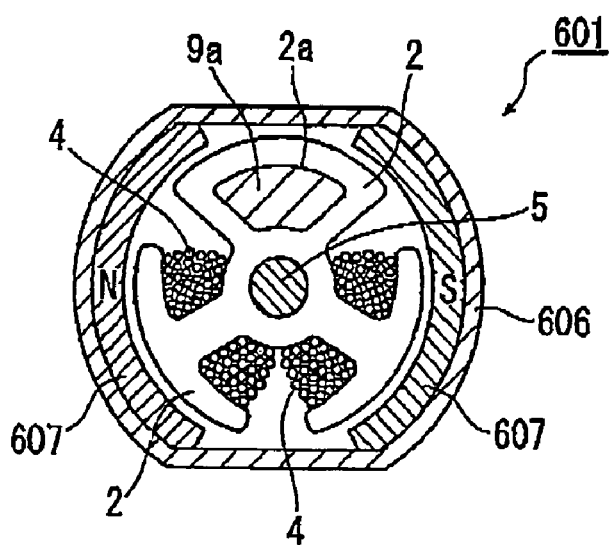
FIG. 20 is a schematic radial cross-sectional view of a variation example of the first embodiment in which the frame of the motor with a commutator has a different shape.

In FIG. 20, components similar to those of FIG. 2 are designated by like reference numerals and their detailed descriptions are omitted accordingly.

The motor 601 is different from the motor 1 shown in FIG. 2 in that a magnet 607 is disposed at the flat planes. Thus, the motor 601 can achieve advantageous effects of reducing the motor dimension and also easing motor disposition design.

Further, the motor 601 is further advantageous in that no further consideration needs to be taken about the space around the weight.

Moreover, the motor 601 generates vibration in a different direction, which can improve a physical sensation of vibration.

Furthermore, according to the motor 601, the frame 606 has plane portions and therefore can be mounted flatly on a substrate. Thus, the motor 601 can be used as an SMD (Surface Mount Device).

Additionally the features of the embodiments described above may be combined as appropriate, which still falls within the scope of the present invention.

While this invention has thus far been described in conjunction with only several embodiments thereof, it will now be readily possible for those skilled in the art to put this invention into various other manners.

For example, in each of the above-described embodiments, a motor with a commutator is used as an example of a vibration motor of the present invention. However, the present invention can be applied to any vibration motors other than the motor with a commutator

What is claimed is:

1. A vibration motor comprising:
    a rotary shaft;
    armature cores secured to the rotary shaft and comprising a plurality of salient poles;
    armature coils wound around the salient poles except at least one salient-pole of the armature cores;
    a commutator piece electrically connected to the armature coils;
    a frame serving as an outside cover;
    a plurality of magnets secured to the frame, each comprising different polarity; and
    a weight extending along the shaft, adapted to rotate together with the shaft and structured eccentrically to be weighted with respect to the rotary shaft,
    wherein the weight is disposed inside the frame and secured to the armature core in such a manner that a part of the weight is inserted in a hollow provided in the at least one salient pole having no armature coil.

2. A vibration motor according to claim 1, further comprising a weight holding member positioned at a side opposite to the armature cores on the rotary shaft with respect to the weight for holding the weight on the rotary shaft.

3. A vibration motor comprising:
    a rotary shaft
    armature cores secured to the rotary shaft and comprising a plurality of salient poles;
    armature coils wound around the salient poles except at least one salient-pole of the armature cores;
    a commutator piece electrically connected to the armature coils;
    a frame serving as an outside cover;
    a plurality of magnets secured to the frame, each having different polarity; and
    a weight extending along the shaft, adapted to rotate together with the shaft and structured eccentrically to be weighted with respect to the rotary shaft,
    a first weight holding member positioned at a side of the armature cores on the rotary shaft, and
    a second weight holding member positioned at a side opposite to the armature cores on the rotary shaft, wherein the weight is disposed inside the frame and secured to the armature core in such a manner that a part of the first weight holding member is inserted in a hollow provided in the at least one salient pole having no armature coil, and wherein the weight is held on the rotary shaft by the second weight holding member.

4. A vibration motor according to claim 1, wherein an outermost radius of the weight is eater than a radius of a circle defined by radially inward surfaces of the magnets.

5. A vibration motor according to claim 3, wherein an outermost radius of the weight is greater than a radius of a circle defined by radially inward surfaces of the magnets.

6. A vibration motor according to claim 1, wherein the frame comprises a cross section in which two plane portions are provided.

7. A vibration motor according to claim 6, wherein the plane portion is attached to a mounting board.

8. A vibration motor according to claim 1, wherein the armature coils make a V-connection.

9. A vibration motor according to claim 3, wherein the weight and the first weight holding member are engagingly connected to each other.

10. A vibration motor according to claim 1, wherein a radially inner portion of the plurality of magnets are disposed radially outward of a radially outward portion of the plurality of salient poles, in relation to the rotary shaft.

11. A vibration motor according to claim 3, wherein the weight is disposed axially between the first weight holding member and the second weight holding member.

* * * * *